T. R. BAILEY, Jr.
HYDRANTS.
No. 6,990. Reissued March 14, 1876.
Fig 1 —
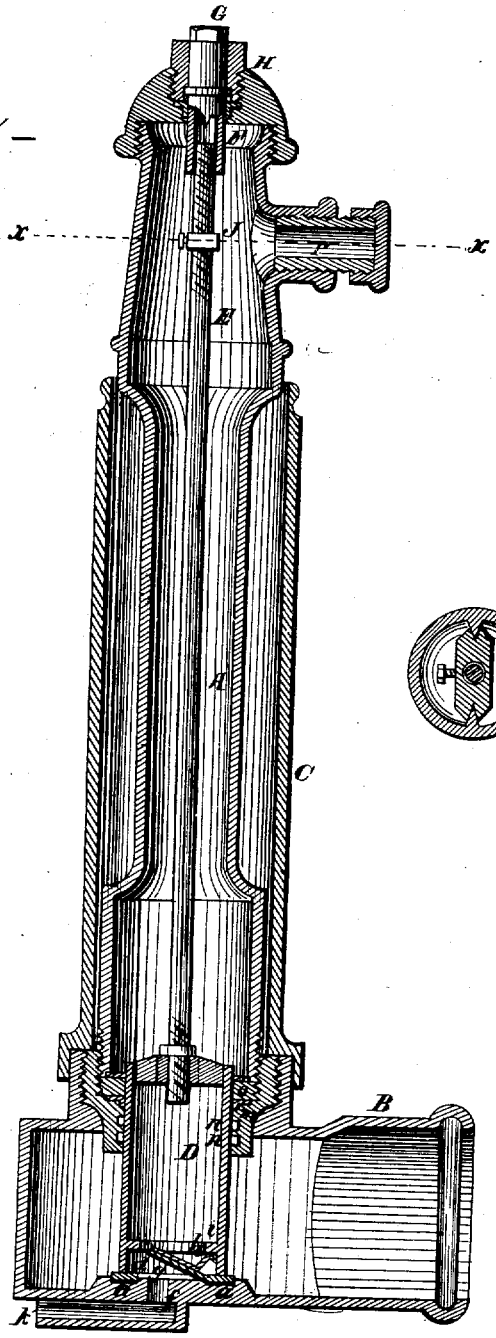
Fig 2 —
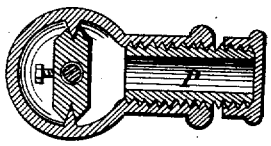
WITNESSES
E. S. Nottingham
Albert M. Wright
INVENTOR
T. R. Bailey Jr.
By Leggett & Leggett, Attorneys.
THE NORRIS PETERS CO., PHOTO-LITHO., WASHINGTON, D. C.

UNITED STATES PATENT OFFICE.

THOMAS R. BAILEY, JR., OF LOCKPORT, NEW YORK.

IMPROVEMENT IN HYDRANTS.

Specification forming part of Letters Patent No. 75,344, dated March 10, 1868; reissue No 6,990, dated March 14, 1876; application filed February 17, 1876.

*To all whom it may concern:*

Be it known that I, T. R. BAILEY, Jr., of Lockport, in the county of Niagara and State of New York, have invented a new and Improved Hydrant Fire-Plug; and I do hereby declare the following to be a full, clear, and exact description thereof, which will enable others skilled in the art to which my invention relates to make and use the same, reference being had to the accompanying drawing, which forms a part of this specification.

This invention relates to improvements in the construction of fire-plugs or hydrants.

In the drawing, Figure 1 represents a longitudinal central section of a hydrant according to my invention; Fig. 2, a cross-section of the same through lines *x x* of Fig. 1.

My invention consists in the following parts and combinations, as hereinafter specified and claimed, wherein A represents the hydrant-tube from which water is discharged. B is the horizontal section which is connected with the water-main, and which may form the valve-chamber. C is a loose movable casing around the hydrant-tube. D is the cylinder-valve, having its seat at its lower end, upon suitable elastic packing secured in a groove, as shown at *a*. E is a rod having a screw-thread on its upper end, by which the valve is operated. F is a sleeve-nut engaged with the screw-nut on the rod E, lifting and lowering said rod as the nut is turned one way or another. This nut is turned by a wrench or crank or other suitable device on the head G. The sleeve-nut is screwed in the cap of the hydrant by a collar and packing, under the hollow cylinder stuffing-box H. J is a yoke which is attached to the rod E by a set-screw or its equivalent, and it is screwed in the tube A, and prevented from turning as it moves up and down by projecting lugs, as shown in detail at Fig. 2.

It will be noticed that the arrangement is such that the rod and valve may be raised and lowered without being rotated, thus securing a uniform and perfect bearing of the valve on its seat, the packing *a* remaining undisturbed.

Provision is made for the discharge of the waste water by an orifice, *f*, beneath the valve *d*, which orifice is opened and closed by a valve, *g*. A wing, *h*, is provided upon the top of this valve. As the cylinder-valve D descends the annular flange *i* on its inside striking the wing *h*, raises the valve, as shown in the drawing, and allows any water which may remain in the hydrant to escape down through the orifice *f* and aperture K, thus preventing any retention of water above the freezing level.

The tube A′ is secured to the horizontal section B by a ring-nut, *m*, which contains recesses for packing-rings around the valve, as shown at *n*. Packing about the valve is also secured by another ring-nut, *o*, and also under the end of the tube A, as shown in the drawings.

P represents the discharge-pipe, with a screw for the attachment of the base, and a cap-piece for covering the pipe when the hydrant is not in use.

It will be observed that the casing C loosely rests upon the main B, or upon a branch projecting upward from the same. This casing extends upward, enveloping the main portion of the water-pipe A, at least that portion which is subterranean. Said casing extends upward and fits loosely about the plug or hydrant at the portion A′. Above the upper terminus of the casing C is provided the bead *a* upon the hydrant proper. Sufficient space is left between the bead *a* and the upper terminus of the casing C to permit of sufficient up-and-down play of the said casing C, for the purpose which will hereafter more fully appear. This distance between the bead and casing may be adjusted to any desired distance, thus lengthening or shortening it by means of its screw attachment at its base.

The main function of the casing C is to prevent derangement of parts during cold weather by the ground alternately freezing and thawing around the hydrant or plug. This process of freezing causes the surrounding earth, by its expansion, to lift or upheave, and thus be liable to derange the hydrant or plug. This upheaval or movement is received by the casing C, which, by its capability of sliding loosely up and down, will accommodate the upheaval of the earth above mentioned, without any liability to derange the plug or hydrant. This is the chief function of the casing C, although it likewise serves the purpose of protection to the water-pipe A.

What I claim is—

1. In combination with a hydrant or fire-plug, a detached and surrounding casing, C, said casing adapted to have an independent up-and-down motion sufficient to receive the entire movement imparted by the upheaval of the surrounding earth by freezing, without derangement or disturbance of the hydrant or plug proper, substantially as shown.

2. In combination with a hydrant or fire-plug pipe, A, the supply-pipe B, and cylinder valve and waste-valve, connected and operated substantially as herein shown and described.

3. The combination of the hydrant or fire-plug pipe A, supply-pipe B, valve D, casing C, and stuffing-box H, substantially as and for the purpose shown.

THOMAS R. BAILEY, JR.

Witnesses:
I. R. COMPTON,
E. WEST.